(12) United States Patent
Wang et al.

(10) Patent No.: US 11,941,055 B2
(45) Date of Patent: Mar. 26, 2024

(54) METHOD AND APPARATUS FOR GRAPH COMPUTING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yang Wang, Beijing (CN); Xunchao Song, Beijing (CN); Pengcheng Yuan, Beijing (CN); Yifei Wang, Beijing (CN); Haiping Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 753 days.

(21) Appl. No.: 17/076,370

(22) Filed: Oct. 21, 2020

(65) Prior Publication Data
US 2021/0224139 A1    Jul. 22, 2021

(30) Foreign Application Priority Data

Jan. 22, 2020 (CN) .......................... 202010074245.4

(51) Int. Cl.
*G06F 16/901* (2019.01)
(52) U.S. Cl.
CPC .............................. *G06F 16/9024* (2019.01)
(58) Field of Classification Search
None
See application file for complete search history.

(56) References Cited

U.S. PATENT DOCUMENTS 9,223,551 B1    12/2015  Heinrich
10,432,639 B1*  10/2019  Bebee ............... G06F 16/90335
(Continued)

FOREIGN PATENT DOCUMENTS

CN    102682138 A    9/2012
CN    103559016 A    2/2014
(Continued)

OTHER PUBLICATIONS

Office Action for Japanese Application No. 2021-008619, dated Jul. 26, 2022, 3 pages.
Ito Ryuichi et al., "The forum about the improvement in the speed of a graph manipulation engine", DEIM Forum, Mar. 2, 2016, 9 pages.
(Continued)

*Primary Examiner* — Richard L Bowen
(74) *Attorney, Agent, or Firm* — Lippes Mathias LLP

(57) ABSTRACT

The present disclosure provides a method for graph computing, an electronic device and a non-transitory computer-readable storage medium. An execution engine for managing execution of the graph computing is configured in a CPU. One or more interface functions running in a GPU for processing parameters of the graph computing are configured. During the execution of the graph computing, the one or more interface functions are called by the execution engine through a graph computing interface. The interface functions are executed in the GPU in parallel through multiple parallel threads. The interface functions are configured to process a plurality of graph vertexes in parallel. The multiple parallel threads are configured to feedback respective execution results of the interface functions to the execution engine. The graph computing is completed by the execution engine according to the execution results.

18 Claims, 5 Drawing Sheets

(56) References Cited

U.S. PATENT DOCUMENTS

| | | | |
|---|---|---|---|
| 2008/0276220 | A1 | 11/2008 | Munshi et al. |
| 2008/0276262 | A1 | 11/2008 | Munshi et al. |
| 2015/0235339 | A1 | 8/2015 | Soum et al. |
| 2017/0295379 | A1 | 10/2017 | Sun et al. |
| 2018/0225802 | A1 | 8/2018 | Vij et al. |
| 2018/0262883 | A1 | 9/2018 | Li et al. |
| 2019/0196853 | A1 | 6/2019 | Koblents et al. |
| 2019/0205745 | A1* | 7/2019 | Sridharan ............. G06F 9/5061 |
| 2019/0370927 | A1 | 12/2019 | Frenkel et al. |
| 2020/0065109 | A1* | 2/2020 | Shen ................... G06F 9/30036 |
| 2022/0240440 | A1* | 8/2022 | Garcia Rojas ......... A01C 7/081 |

FOREIGN PATENT DOCUMENTS

| | | |
|---|---|---|
| CN | 104835110 A | 8/2015 |
| CN | 105159761 A | 12/2015 |
| CN | 106126521 A | 11/2016 |
| CN | 108460458 A | 8/2018 |
| CN | 108986013 A | 12/2018 |
| CN | 109345239 A | 2/2019 |
| CN | 109933429 A | 6/2019 |
| CN | 110275771 A | 9/2019 |
| CN | 110659312 A | 1/2020 |
| IN | 110517079 A | 11/2019 |
| JP | 2019500685 A | 1/2019 |

OTHER PUBLICATIONS

Office Action for Japanese Application No. 2021-008619, dated Dec. 7, 2021, 4 pages.

OA for CN application 202010074245.4, Jan. 11, 2023—(9 pgs).

English translation of OA for CN application 202010074245.4 (15 pgs).

Xie, "Software & Hardware Architecture of General-Purpose Graphics Processing Unit" Xi'an Aeronautics Computing Technique Research Institute, AVIC, Xi'an 710068, China Aeronautical Computing Technique, vol. 43, No. 2, Mar. 2013 (4 pgs).

Ravi et al. "Compiler and runtime enabling for Generalized Reduction Computations on Heterogeneous Parallel Configurations", Department of Computer Science and Engineering, The Ohio State University Columbus OH 43210 ICS'10, Jun. 2-4, 2010, Tsukuba, Ibaraki, Japan, Copyright 2010 ACM 978-1-4503-0018-Jun. 10, 2006 (10 pgs).

Min-Soo Kim et al., "GTS: A Fast and Scalable Graph Processing Method based on Streaming Topology to GPUs". SIGMOD '16, Jan. 1, 2016, San Francisco, CA USA, pp. 447-461.

Shuai Che, "GasCL: A Vertex-Centric Graph Model for GPUs", Advanced Micro Device, IEEE, Sep. 9, 2014, pp. 1-6.

Dipanjan Sengupta, "GraphReduce: Processing Large-Scale Graphs on Accelerator-Based Systems", Association for Computing Machinery, SC '15, Nov. 15, 2015, Austin, TX, USA, pp. 1-12.

Extended EP Search Report for Application No. 20202640.7, dated Apr. 14, 2021, 10 pages.

* cited by examiner processing architecture of graph computing user programming interface execution engine graph database query interface graph index

FIG. 1

METHOD AND APPARATUS FOR GRAPH COMPUTING, ELECTRONIC DEVICE AND STORAGE MEDIUM

CROSS REFERENCE TO RELATED APPLICATIONS

This application claims priority and benefits to Chinese Application No. 202010074245.4, filed on Jan. 22, 2020, the entire content of which is incorporated herein by reference.

TECHNICAL FIELD

The present disclosure relates to a field of computer technologies, and more particularly, to a field of graph database.

BACKGROUND

Online Analytical Processing (OLAP) is a database analysis technology. OLAP technology is applied for full graph analysis on a graph database.

Computing resources of existing graph database systems are fixed. The graph database systems are configured to implement OLAP, for a large database, hundreds of service vertexes need to be configured as the computing resources.

SUMMARY

The present disclosure provides a method for graph computing. The method includes: configuring an execution engine in a central processing unit (CPU), in which the execution engine is configured to manage execution of the graph computing; configuring one or more interface functions running in a graphics processing unit (GPU), in which the one or more interface functions are configured to process or feedback parameters of the graph computing; during the execution of the graph computing, calling, by the execution engine, the one or more interface functions through a graph computing interface; in which the interface functions are executed in the GPU in parallel through a plurality of parallel threads, the interface functions are configured to process a plurality of graph vertexes in parallel, and the plurality of parallel threads are configured to feedback respective execution results of the interface functions to the execution engine; and completing the graph computing by the execution engine according to the execution results.

The present disclosure provides an electronic device. The electronic device includes: a memory, a central processing unit (CPU), a graphics processing unit (GPU), and a computer program stored in the memory and capable of running on the CPU and the GPU. When the CPU executes the program, a method for graph computing is implemented.

The present disclosure provides a storage medium including computer-executable instructions. When the computer-executable instructions are executed by the computer processor, a method for graph computing is implemented.

Additional effects of the above-mentioned optional manners will be described below in combination with specific embodiments.

BRIEF DESCRIPTION OF THE DRAWINGS

The accompanying drawings are used to better understand the solution, and do not constitute a limitation on the application, in which:

FIG. 1 is a schematic diagram illustrating an architecture according to embodiments of the present disclosure.

DETAILED DESCRIPTION

Figure 2:
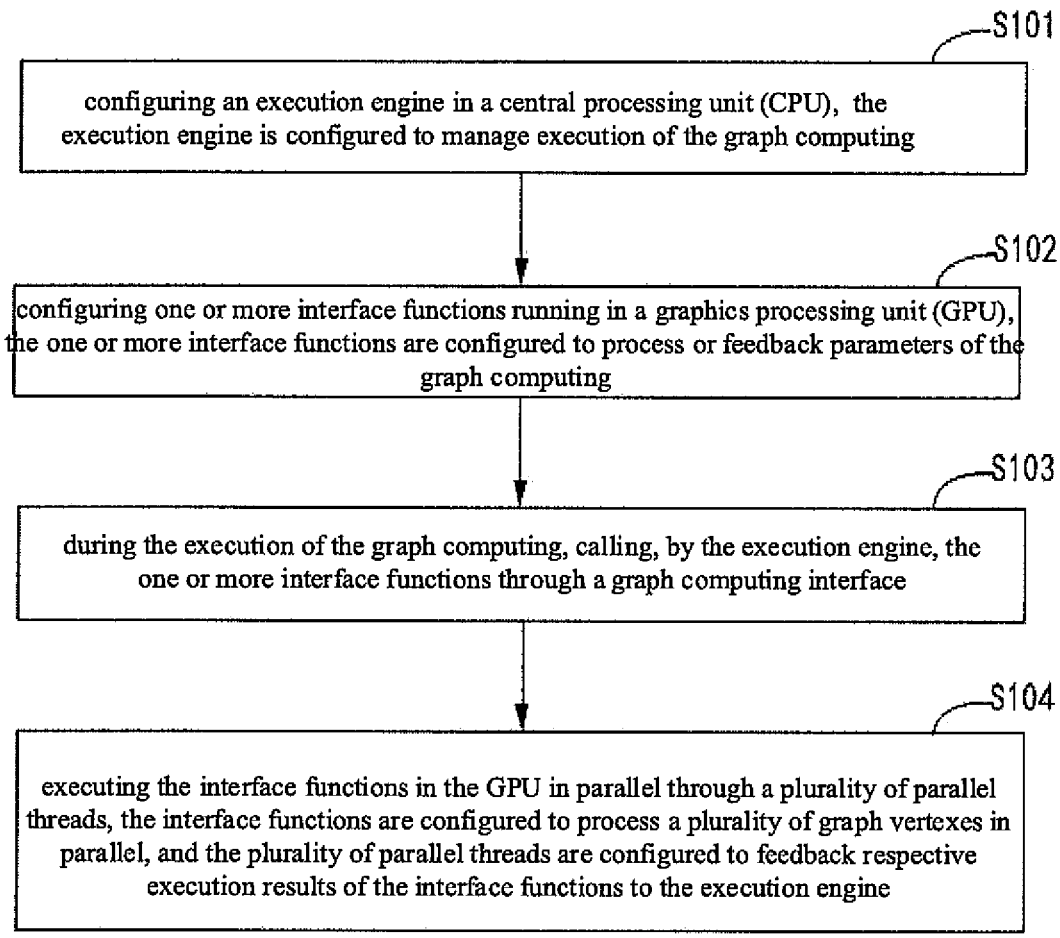
FIG. 2 is a flowchart according to embodiments of the present disclosure.

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Computing resources of existing graph database systems are fixed. The graph database systems are configured to implement OLAP, for a large database, hundreds of service vertexes need to be configured as the computing resources. This configuration method is costly. However, when computing resources of a graph database are limited to reduce costs, computing speed of the graph database is greatly reduced. Therefore, how to ensure efficient graph computing efficiency based on fixed computing resources has become an urgent problem to be solved.

FIG. 1 is a schematic diagram illustrating a processing architecture of graph computing according to embodiments of the present disclosure. The processing architecture is configured to implement highly-concurrent graph computing and improve the efficiency of graph computing through collaborative processing of the CPU (central processing unit) and the GPU (graphics processing unit) in the electronic device. The processing architecture includes a user programming interface 010, an execution engine 020, a graph database query interface 030 and a graph index 040.

The execution engine 020 executes operations of the graph computing in the CPU. Interface functions running in the GPU are called through the user programming interface 010. A database is accessed through the graph database query interface 030 via the execution engine 020 when requiring to obtain data of vertexes in the graph. The graph index 040 is provided via the database.

The electronic device includes the CPU and the GPU. The execution engine 020 runs in the CPU. The execution engine 020 is configured to perform operations of the graph computing and manage execution of the graph computing. The execution engine 020 call the interface functions through the user programming interface 010 during the execution of the graph computing.

The above-mentioned "interface functions" are the interface functions edited by the user, which are used to realize processing functions of a certain vertex. The functions of the interface functions are fixed. The user (such as a programmer or database manager) may program according to their own programming habits to obtain the interface functions, so that the functions of the interface functions match predefined functions of the interface functions.

The interface functions may be called by the execution engine 020 through the user programming interface 010. When the execution engine 020 executes the graph computing, the user programming interface 010 may be adopted in a manner of parameter substitution or being called. When the interface functions are called and run in the GPU in parallel, the graph computing at multiple vertexes may be processed simultaneously. Upon the completion of predetermined functions of the interface functions, the interface functions feed resultant data back to the execution engine 020 through the user programming interface 010.

In the process of graph computing or obtaining the graph index 040 of a target vertex, the graph index 040 is often stored in the database. In the above process, the execution engine 020 initiates the query of the graph index 040 to the database through the database query interface. The graph index 040 is obtained through a native graph database query engine. Based on the graph index 040 stored on the database, the database feeds index information of the target vertex back to the execution engine 020 through the database query interface.

In the architecture of the graph computing according to embodiments of the present disclosure, the execution engine 020 running in the CPU is capable of calling the user programming interface 010. The interface function corresponding to the user programming interface 010 runs in the GPU. When data such as adjacency indexes of the target vertex is required, the execution engine 020 accesses the database through the database query interface and obtains adjacent vertexes of the target vertex by accessing the graph index 040 provided by the graph database to complete the graph computing. The above architecture provides a system framework for efficiently providing data services and concurrently executing data processing between the CPU and the GPU, so that based on fixed computer resources, highly-concurrent vertex processing is realized through the GPU and the execution engine 020 manages the execution of the graph computing, thereby improving the processing efficiency of the graph computing and providing concurrent processing capabilities.

FIG. 2 is a schematic diagram illustrating a method for graph computing according to embodiments of the present disclosure. This method is applicable for graph computing, especially the graph computing that is executed collaboratively by the CPU and the GPU. The method may be executed by an electronic device that is configured to perform the graph computing. The electronic device may be a personal computer, a server, or a smartphone, or a tablet computer. The method includes the following.

In block 101, an execution engine is configured in a central processing unit (CPU). The execution engine is configured to manage execution of the graph computing.

Processor resources may be required from the CPU to be used by the execution engine. The execution engine is configured to load the process of the graph computing.

In block 102, one or more interface functions running in a graphics processing unit (GPU) are configured. The one or more interface functions are configured to process or feedback parameters of the graph computing.

The interface functions in the GPU may be called by the execution engine. When the execution engine calls the interface functions, the GPU may allocate resources to execute the interface functions.

The block 101 and the block 102 are executed in no particular order, and could be executed simultaneously.

In block 103, during the execution of the graph computing, the one or more interface functions are called by the execution engine through a graph computing interface.

The graph computing is applicable to a variety of scenarios, especially full graph computing scenarios in OLAP, such as Pagerank, Lpa, and connectivity. The entire user graph computing (e.g., pagerank and lpa) is driven by the execution engine. Pagerank, also known as web page weight analysis, is used to perform weight analysis on all web pages in the entire web page library. Lpa is also known as community discovery. For example, Lpa is used to label some accounts suspected of fraud in a financial transaction database and deduce possible fraud users. For the convenience of description, following embodiments take the execution of PAgerank as an example for description.

During the execution of the graph computing, the execution engine performs the graph computing in response to operations of a graph database from the user. When the execution engine executes the graph computing, the parameters used in the graph computing are determined as input parameters and the interface functions are called. The interface functions run in the GPU.

In block 104, the interface functions run in the GPU in parallel through multiple parallel threads. The interface functions are configured to process multiple graph vertexes in parallel. The parallel threads are configured to feed respective execution results of the interface functions back to the execution engine.

When the storage space of the GPU is capable of accommodating all computed objects included in the full graph computing, the GPU processes each vertex respectively through parallel threads. Each thread runs the same interface function for its own processing vertex, and feeds back the feedback data of the corresponding vertex, so as to realize the parallel processing of graph computing through the parallel threads in the GPU. Each thread in the GPU is executed by a stream processor. The stream processor in the GPU is capable of executing concurrently operations on a large scale.

For example, the full graph contains 100 stages. The storage space in the GPU is capable of storing data of 100 vertex. 100 stream processors may be configured in the GPU to execute 100 parallel threads and process 100 vertexes in parallel. Each thread performs a prediction on a gathering direction and feeds back the parameters of in edges of each vertex.

In embodiments of the present disclosure, the GPU is generally applicable for machine learning and graph computing, rarely used in database processing. The GPU has a large number of stream processors. Each stream processor can be seen as a weakened CPU. These stream processors are capable of executing operations concurrently on a large scale (millions). The cost of performing operations in parallel through the plurality of parallel threads in the GPU is much lower than the cost of performing operations in parallel through the conventional CPU.

In block 105, the graph computing is completed by the execution engine according to the execution results.

In the method for graph computing according to embodiments of the present disclosure, the execution engine is configured in the CPU, and one or more interface functions running in the GPU are configured. During the execution of the graph computing, by the execution engine in the CPU, the one or more interface functions are called through the graph computing interface. The interface functions are performed in parallel through the multiple parallel threads in the GPU. The interface functions are configured to process the multiple graph vertexes in parallel. The multiple parallel threads are configured to feedback respective execution results of the interface functions to the execution engine. The graph computing is completed by the execution engine according to the execution results. Compared with existing methods for the graph computing that merely use results of the CPU with fixed computing resources and low parallel processing efficiency, in embodiments of the present disclosure, the execution engine in the CPU may manage the execution of the graph computing based on the capability of high concurrency provided by the GPU, and the execution engine may call the one or more interface functions running in the GPU during the execution of the graph computing. In the execution of the full graph processing, the multiple vertexes contained in the graph may be processed in parallel in the GPU. Therefore, with the fixed computing resources, highly concurrent processing of vertexes in parallel may be realized and graph computing efficiency may be improved.

Further, the memory space of the CPU is relatively large, and large amounts of graph data may be read. The memory space of the GPU is smaller than the memory space of the CPU. Therefore, the data read and processed by the CPU at one time cannot be transmitted to the GPU for processing in a single transmission. Directly transmitting the data may be error prone, resulting in data loss. Based on this, in the block 103, calling the one or more interface functions may include partitioning, by the execution engine, graph data to be processed according to a size of memory space of the GPU to obtain a plurality of fractions of vertexes; and calling, by the execution engine, the one or more interface functions through the graph computing interface to sequentially perform the graph computing on the plurality of fraction of vertexes. The size of each fraction of the vertex matches with the size of the memory space of the GPU.

The CPU obtains the size of the memory space of the GPU in advance. If the amount of graph data that could be processed currently is greater than the size of the memory space of the GPU, the graph data is partitioned according to the size of the memory space of the GPU to obtain a plurality of fractions of vertexes. The data amount of each fraction of vertex is equal to the size of the memory space of the GPU.

For example, block by block technique may be adopted to partition the graph data. The execution engine may predict the size and performs the partition based on the vertexes.

In the method for graph computing according to embodiments of the present disclosure, it is possible to solve the problem that the size of the memory of the CPU does not match with the size of the memory of the GPU such that the GPU cannot process all graph data due to the small size of the memory. The execution engine in the CPU partitions the data to be processed according to the size of the memory of the GPU, so that the partitioned fractions of vertexes match with the size of the memory of the GPU. The GPU could process the partitioned fractions of vertexes at one time, that is, the graph computing of all data to be processed is completed, thereby improving reliability.

Figure 3:
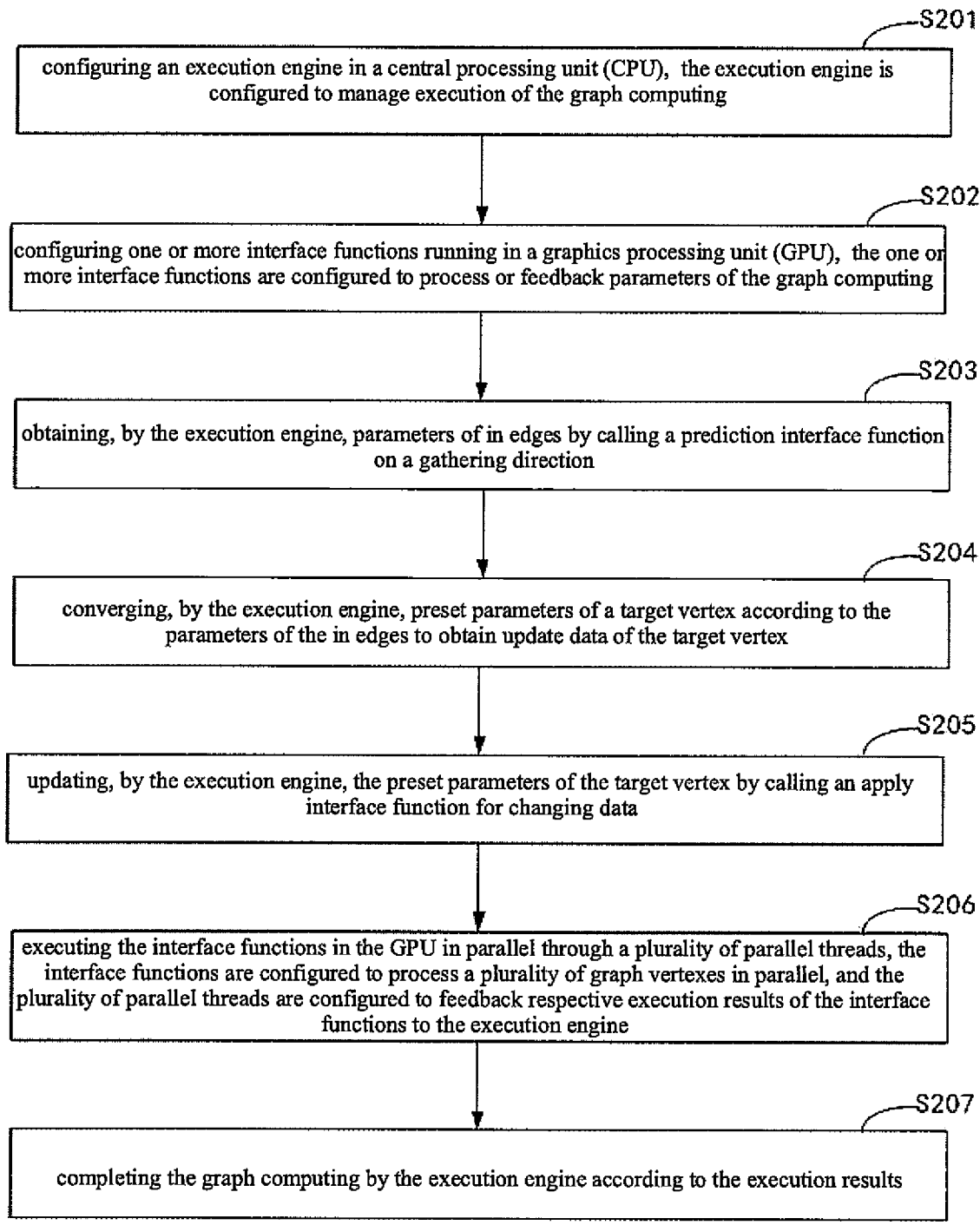
FIG. 3 is a flowchart according to embodiments of the present disclosure.

FIG. 3 is a schematic diagram illustrating a method for graph computing according to embodiments of the present disclosure. As a further description of the foregoing embodiments, the method includes the following.

In block 201, an execution engine is configured in a central processing unit (CPU). The execution engine is configured to manage execution of the graph computing.

In block 202, one or more interface functions running in the graphics processing unit (GPU) are configured. The one or more interface functions are configured to process or feedback parameters of the graph computing.

The block 201 and the block 202 may be executed in no particular order.

In block 203, during the execution of the graph computing, the execution engine obtains parameters of in edges by calling a prediction interface function (gather_edge) on a gathering direction.

When performing the full graph processing, embodiments of the present disclosure provide a processing idea of gathering-applying-scattering (GAS for short). This processing idea is to abstract a roughly general computing process, to divide an entire graph computing into three steps. These three steps simultaneously (concurrently) act on each vertex. The gathering (or collecting) includes collecting information on neighboring vertexes of a current vertex, and applying corresponding algorithms. The applying, also known as updating, includes: applying a computing result of the first step to the current vertex. The scattering, also known as broadcasting (or signaling), includes: broadcasting data of the current vertex to the neighboring vertexes.

The input parameters of the prediction interface function (such as gather_edge) on the gathering direction are vertex data used to identify a certain vertex in the graph. The execution engine copies the vertex data to the GPU, and transmits the data as parameters to the prediction interface function (such as the gather_edge) on the gathering direction running in the GPU.

For example, the execution engine determines parameters of a currently processed vertex A as parameters to call the prediction interface function (such as the gather_edge) on the gathering direction, so as to receive parameters of the vertex A fed back by the prediction interface function (such as the gather_edge) on the gathering direction.

In the PageRank scenario, it is necessary to calculate weights of adjacent vertexes based on the in edges, so that the prediction interface function (such as the gather_edge) on the gathering direction returns the parameters of the in edges.

In block 204, the execution engine converges preset parameters of a target vertex according to the parameters of the in edges to obtain update data of the target vertex.

The execution engine obtains correspondent vertexes of the in edges of the target vertex, and sums the preset parameters of the correspondent vertexes to obtain the update data of the target vertex. In the PageRank scenario, the preset parameters may be a weight of the vertex.

In block 205, the execution engine updates the preset parameters of the target vertex by calling an apply interface function (such as apply) for changing data.

After obtaining the update data of the target vertex in the block 204, the execution engine updates the preset parameters of the target vertex by calling the apply interface function (such as apply) for changing data to realize update of the preset parameters of the target vertex. At this time, the update data is determined as the parameters to call the apply interface function (such as apply) for changing data.

Further, a value of difference between the update data and the original data (which is the value of the preset parameter before the target vertex is updated) may be checked and stored. Subsequent operations such as further analysis could be executed based on this value of difference.

In block 206, the interface functions run in the GPU in parallel through a plurality of parallel threads. The interface functions are configured to process a plurality of graph vertexes in parallel. The plurality of parallel threads are configured to feed respective execution results of the interface functions back to the execution engine.

It should be noted that when the interface functions are called, a plurality of stream processors in the GPU are used to perform parallel processing on a plurality of vertexes in the graph data. For example, both the prediction interface function (such as the gather_edge) on the gathering direction and the apply interface function (such as the apply) for changing data could perform the interface functions in parallel on the GPU.

In block 207, the graph computing is completed by the execution engine according to the execution results.

In the method for graph computing according to embodiments of the present disclosure, rapid concurrent processing of the multiple vertexes is realized simultaneously by calling the interface functions executed in the GPU, thereby improving processing efficiency. In addition, the convergence and the application of vertexes may be executed in parallel.

Further, in some application scenarios, in addition to the convergence and the application of the vertexes, it is also necessary to notify the update data to the correspondent vertexes of the out edges of the target vertex to complete the scattering. On the basis, in the block 205, after the execution engine updates the preset parameters of the target vertex by calling the apply interface function for changing data, the method further includes the following.

In block 208, the execution engine obtains parameters of out edges of the target vertex by calling a prediction interface function (such as a scatter_edge) on a scattering direction.

The input parameters of the prediction interface function (such as the scatter_edge) on the scattering direction is the vertex data used to identify a certain vertex in the graph. The execution engine copies the vertex data to the GPU, and transmits the data as parameters to the prediction interface function (such as the scatter_edge) on the scattering direction running in the GPU.

For example, the execution engine determines parameters of a currently processed vertex A as parameters to call the prediction interface function (such as the scatter_edge) on the scattering direction, so as to receive parameters (OUT) fed back by the prediction interface function (such as the scatter_edge) on the scattering direction based on the vertex A.

After the update data of the target vertex is updated using the apply interface function (such as the apply) for changing data in the block 205, the value of different stored by the apply interface function (such as the apply) for changing data is obtained. If the value of difference converges, NONE is fed back. If the value of different diverges, OUT is fed back. In the PageRank scenario, after updating the update data of the target vertex, correspondent vertexes of the out edges (also called as out neighbors) of the target vertex are notified of the update data of the target vertex.

In block 209, the execution engine updates a correspondent vertex of the out edges with the update data by calling a scatter interface function (such as the scatter).

When the prediction interface function (such as the scatter_edge) on the scattering direction returns the divergent parameter OUT, the execution engine calls the scatter interface function (such as the scatter) to update the update data of the target vertex to the correspondent vertexes of the out edges of the target vertex.

In the method for graph computing according to embodiments of the present disclosure, some scenes require divergence after convergence, such as PageRank scene and LPA scene. After the preset parameters of the target vertex are updated, the preset parameters of the target vertex are sent to the correspondent vertex of the out edges, so that the vertex information in the graph is symmetrical and the accuracy of the information in the graph is improved.

Figure 4:
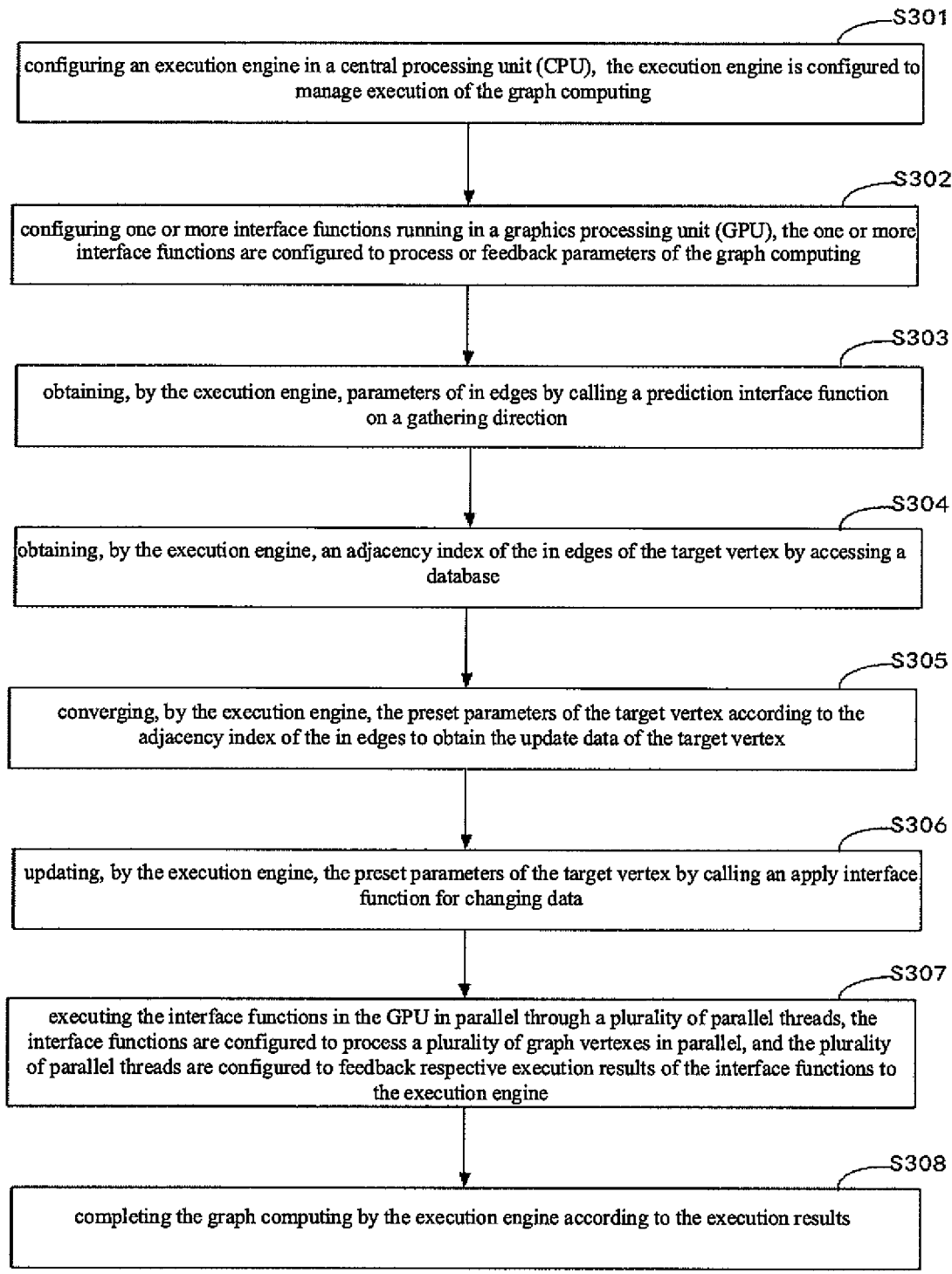
FIG. 4 is a flowchart according to embodiments of the present disclosure.

FIG. 4 is a schematic diagram illustrating a method for graph computing according to embodiments of the present disclosure. As a further description of the foregoing embodiments, the method includes the following.

In block 301, an execution engine is configured in a central processing unit (CPU). The execution engine is configured to manage execution of the graph computing.

In block 302, one or more interface functions running in a graphics processing unit (GPU) are configured. The one or more interface functions are configured to process or feedback parameters of the graph computing.

The block 301 and the block 302 may be executed in no particular order.

In block 303, during the execution of the graph computing, the execution engine obtains parameters of in edges by calling a prediction interface function (such as gather_edge) on a gathering direction.

In block 304, the execution engine obtains an adjacency index of the in edges of the target vertex by accessing a database.

When the execution engine receives the parameters of the in edges fed back by the prediction interface function (such as the gather_edge) on the gathering direction, the execution engine accesses the database through a database accessing interface and retrieves the adjacency index of the in edges of the current vertex from the database.

In block 305, the execution engine converges the preset parameters of the target vertex according to the adjacency index of the in edges to obtain the update data of the target vertex.

If the current vertex has multiple in edges, the preset parameters (e.g., weight parameters) of the correspondent vertexes of the in edges of the current vertex are obtained respectively. The preset parameters of the correspondent vertexes of the in edges are summed to converge the preset parameters of the target vertex.

In some embodiments, the block 305 could be implemented in the following manners.

1) The execution engine obtains each of the in edges according to the adjacency index of the in edges.
2) The execution engine obtains the preset parameters of the correspondent vertexes of each in edge by calling a gather interface function (such as a gather).

The gather interface function (such as the gather) is used to feed back the preset parameters of the correspondent vertexes of the in edges to the execution engine. When the target vertex has multiple in edges, the gather interface function (such as the gather) is called for multiple times to obtain the preset parameters of the correspondent vertexes of each in edge in turn. The preset parameters may be weight parameters.

3) The execution engine calls a sum interface function (such as a sum) in the GPU to sum the preset parameters of the correspondent vertexes of the in edges to obtain the update data of the target vertex.

In the parallel processing, there are multiple parallel stream processors arranged in the GPU. In this case, the preset parameters of the current vertex processed in the GPU may be summed by the stream processors. The sum of the preset parameters of the vertexes may be performed in parallel by calling the sum interface function in the GPU through the execution engine, to obtain the update data of each target vertex respectively.

In the above embodiments, the sum may be performed in the GPU. The sum performed by the GPU may enable the concurrent computing of the preset parameters of the vertexes, thereby greatly improving the processing efficiency. Meanwhile, to reduce the load of the CPU, the computing of the sum is relatively simple, and the load on the GPU is small.

In block 306, the execution engine updates the preset parameters of the target vertex by calling an apply interface function (such as the apply) for changing data.

In block 307, the interface functions run in the GPU in parallel through multiple parallel threads. The interface functions are configured to process multiple graph vertexes in parallel. The parallel threads are configured to feed respective execution results of the interface functions back to the execution engine.

In block 308, the graph computing is completed by the execution engine according to the execution results.

In the above embodiments of the present disclosure, the CPU may access the database to obtain the adjacency index and use the database interface to rapidly obtain data from the database, thereby improving the efficiency of data query.

Figure 5:
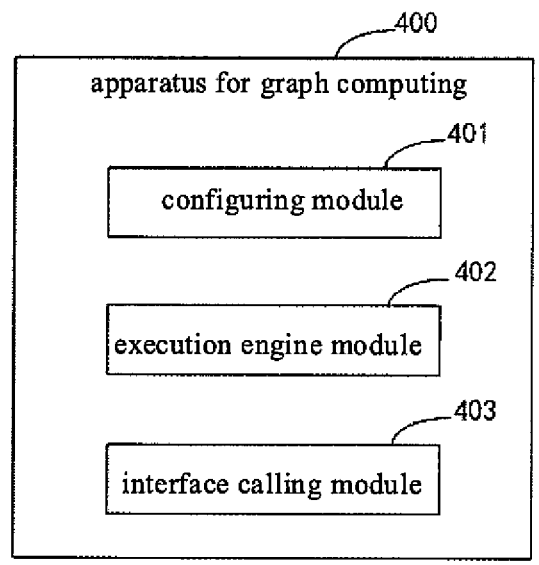
FIG. 5 is a schematic diagram according to embodiments of the present disclosure.

FIG. 5 is a schematic diagram illustrating an apparatus for graph computing 400 according to embodiments of the present disclosure. The apparatus is applicable for graph computing, especially the process of collaboratively performing by the CPU and the GPU the graph computing. The apparatus may include an electronic device for performing the graph computing. The electronic device may be a personal computer, a server, a smart phone, and a tablet computer. The apparatus includes: a configuring module 401, an execution engine module 402, and an interface calling module 403.

The configuring module 401 is configured to configure an execution engine in a central processing unit (CPU). The execution engine is configured to manage execution of the graph computing. In addition, the configuring module 401 is further configured to configure one or more interface functions running in a graphics processing unit (GPU). The one or more interface functions are configured to process or feedback parameters of the graph computing.

The execution engine module 402 is configured to, during the execution of the graph computing, call the one or more interface functions through a graph computing interface.

The interface calling module 403 is configured to perform operations in parallel through a plurality of parallel threads in the GPU. The interface functions are configured to process a plurality of graph vertexes in parallel. The plurality of parallel threads are configured to feedback respective execution results of the interface functions to the execution engine.

The execution engine module 402 is further configured to complete the graph computing according to the execution results.

With the apparatus for graph computing according to embodiments of the present disclosure, the configuring module 401 may configure the execution engine in the CPU and configure one or more interface functions running in the GPU. During the execution of the graph computing, the execution engine module 402 is configured to call the one or more interface functions through the graph computing interface. The interface calling module 403 is configured to execute the interface functions through the plurality of parallel threads in the GPU. The interface functions are configured to process a plurality of graph vertexes in parallel. The plurality of parallel threads are configured to feedback respective execution results of the interface functions to the execution engine. The graph computing is completed by the execution engine according to the execution results. Compared with existing methods for the graph computing that merely use results of the CPU with fixed computing resources and low parallel processing efficiency, in embodiments of the present disclosure, the execution engine in the CPU may manage the execution of the graph computing based on the capability of high concurrency provided by the GPU, and the execution engine may call the one or more interface functions running in the GPU during the execution of the graph computing. In the execution of the full graph processing, the multiple vertexes contained in the graph may be processed in parallel in the GPU. Therefore, with the fixed computing resources, highly concurrent processing of vertexes in parallel may be realized and graph computing efficiency may be improved.

In an implementation of embodiments of the present disclosure, the execution engine module 402 is configured to: obtain, by the execution engine, parameters of in edges by calling a prediction interface function on a gathering direction; converge, by the execution engine, preset parameters of a target vertex according to the parameters of the in edges to obtain update data of the target vertex; and update, by the execution engine, the preset parameters of the target vertex by calling an apply interface function for changing data.

In the above embodiments, by calling the interface functions running in the GPU, rapid concurrent processing of the vertexes is implemented simultaneously, and processing efficiency is improved.

In an implementation of embodiments of the present disclosure, the execution engine module 402 is configured to: obtain, by the execution engine, parameters of out edges of the target vertex by calling a prediction interface function on a scattering direction; and update, by the execution engine, a correspondent vertex of the out edges with the update data by calling a scatter interface function.

In embodiments of the present disclosure, some scenes require divergence after convergence, such as PageRank scene and LPA scene. After the preset parameters of the target vertex are updated, the preset parameters of the target vertex are sent to the correspondent vertex of the out edges, so that the vertex information in the graph is symmetrical and the accuracy of the information in the graph is improved.

In an implementation of embodiments of the present disclosure, the execution engine module 402 is configured to: obtain, by the execution engine, an adjacency index of the in edges of the target vertex by accessing a database; and converge, by the execution engine, the preset parameters of the target. vertex according to the adjacency index of the in edges to obtain the update data of the target vertex.

In embodiments of the present disclosure, the CPU accesses the database to obtain the adjacency index, and use the database interface to rapidly obtain data from the database, thereby improving the efficiency of data query.

In an implementation of embodiments of the present disclosure, the execution engine module 402 is configured to: obtain, by the execution engine, all in edges according to the adjacency index of the in edges; obtain, by the execution engine, preset parameters of a correspondent vertex of each in edge by calling a gather interface function (such as the gather); and call, by the execution engine, a sum interface function in the GPU to sum the preset parameters of the correspondent vertexes of the in edges to obtain the update data of the target vertex.

In embodiments of the present disclosure, the sum operation may be executed in the GPU. The sum operation is executed by the GPU to realize the concurrent calculation of the preset parameters of vertexes and greatly improve the processing efficiency. Meanwhile, to reduce load of the CPU, the sum operation is relatively simple, and the load on the GPU is small.

In an implementation of embodiments of the present disclosure, the execution engine module 402 is configured to: partition, by the execution engine, graph data to be processed according to a size of memory space of the GPU to obtain a plurality of fractions of vertexes, and call, by the execution engine, the one or more interface functions through the graph computing interface to sequentially perform the graph computing on the plurality of fraction of vertexes. A size of each fraction of vertex matches with the size of the memory space of the GPU.

In embodiments of the present disclosure, it is possible to solve the problem that the size of the memory of the CPU does not match with the size of the memory of the GPU such that the GPU cannot process all graph data due to the small size of the memory. The execution engine in the CPU partitions the data to be processed according to the size of the memory of the GPU, so that the partitioned fractions of vertexes match with the size of the memory of the GPU. The GPU could process the partitioned fractions of vertexes at one time, that is, the graph computing of all data to be processed is completed, thereby improving reliability.

According to the embodiments of the present disclosure, the present disclosure also provides an electronic device and a readable storage medium.

Figure 6:
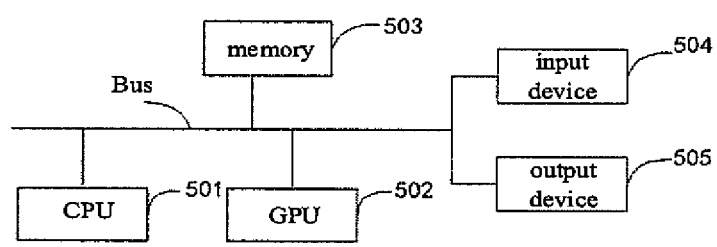
FIG. 6 is a block diagram of an electronic device used to implement the method for graph computing according to an embodiment of the present disclosure.

FIG. 6 is a block diagram illustrating an electronic device used to implement the method for graph computing according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

The electronic device includes: at least one central processing unit (CPU) and at least one graphics processing unit (GPU); and a memory connected in communication with the at least one CPU or GPU. The memory stores instructions executable by the at least one CPU or GPU, and the instructions are executed by the at least one processor.

As illustrated in FIG. 6, the electronic device includes: one or more CPU 501, a GPU 502, a memory 503 and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). The CPU 501 and the GPU 502 are taken as examples in FIG. 6.

The memory 503 is a non-transitory computer-readable storage medium according to the present disclosure. The memory stores instructions executable by at least one processor, so that the at least one processor executes the method for graph computing according to the present disclosure. The non-transitory computer-readable storage medium of the present disclosure stores computer instructions, which are used to cause a computer to execute the method for graph computing according to the present disclosure.

As a non-transitory computer-readable storage medium, the memory 503 is configured to store non-transitory software programs, non-transitory computer executable programs and modules, such as program instructions/modules corresponding to the method for graph computing in the embodiment of the present disclosure (For example, the configuring module 401, the execution engine module 402, and the interface calling module 403 shown in FIG. 6). The CPU 501 or the GPU 502 executes various functional applications and data processing of the server by running non-transitory software programs, instructions, and modules stored in the memory 503, that is, implementing the method for graph computing in the foregoing method embodiment.

The memory 503 may include a storage program area and a storage data area, where the storage program area may store an operating system and application programs required for at least one function. The storage data area may store data created according to the use of the electronic device, and the like. In addition, the memory 503 may include a high-speed random access memory, and a non-transitory memory, such as at least one magnetic disk storage device, a flash memory device, or other non-transitory solid-state storage device. In some embodiments, the memory 503 may optionally include a memory remotely disposed with respect to the CPU 501 and the GPU 502, and these remote memories may be connected to the electronic device through a network. Examples of the above network include, but are not limited to, the Internet, an intranet, a local area network, a mobile communication network, and combinations thereof.

The electronic device for implementing the method for graph computing may further include: an input device 504 and an output device 505. The CPU 501, the GPU 502, the memory 503, the input device 504, and the output device 505 may be connected through a bus or in other manners. In FIG. 5, the connection through the bus is taken as an example.

The input device 504 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 505 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of embodiments of the present disclosure, the execution engine is configured in the CPU, and one or more interface functions running in the GPU are configured. During the execution of the graph computing, by the execution engine in the CPU, the one or more interface functions are called through the graph computing interface. The interface functions are performed in parallel through the multiple parallel threads in the GPU. The interface functions are configured to process the multiple graph vertexes in parallel. The multiple parallel threads are configured to feedback respective execution results of the interface functions to the execution engine. The graph computing is completed by the execution engine according to the execution results. Compared with existing methods for the graph computing that merely use results of the CPU with fixed computing resources and low parallel processing efficiency, in embodiments of the present disclosure, the execution engine in the CPU may manage the execution of the graph computing based on the capability of high concurrency provided by the GPU, and the execution engine may call the one or more interface functions running in the GPU during the execution of the graph computing. In the execution of the full graph processing, the multiple vertexes contained in the graph may be processed in parallel in the GPU. Therefore, with the fixed computing resources, highly concurrent processing of vertexes in parallel may be realized and graph computing efficiency may be improved.

Rapid concurrent processing of the vertexes is implemented simultaneously by calling the interface functions running in the GPU, thereby improving processing efficiency. For some scenes requiring divergence after convergence, such as PageRank scene and LPA scene, after the preset parameters of the target vertex are updated, the preset parameters of the target vertex are sent to the correspondent vertex of the out edges, so that the vertex information in the graph is symmetrical and the accuracy of the information in the graph is improved.

The CPU may access the database to obtain the adjacency index and use the database interface to rapidly obtain data from the database, thereby improving the efficiency of data query. In addition, sum operation is executed in the GPU. The sum operation is executed by the GPU to realize the concurrent calculation of the preset parameters of vertexes and greatly improve the processing efficiency. Meanwhile, to reduce load of the CPU, the sum operation is relatively simple, and the load on the GPU is small.

It is possible to solve the problem that the size of the memory of the CPU does not match with the size of the memory of the GPU such that the GPU cannot process all graph data due to the small size of the memory. The execution engine in the CPU partitions the data to be processed according to the size of the memory of the GPU, so that the partitioned fractions of vertexes match with the size of the memory of the GPU. The GPU could process the partitioned fractions of vertexes at one time, that is, the graph computing of all data to be processed is completed, thereby improving reliability.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for graph computing, comprising:
configuring, by a configuring module, an execution engine in a central processing unit (CPU), wherein processor resources are required from the CPU to be used by the execution engine, and the execution engine is configured to manage execution of the graph computing;
configuring, by an execution engine module, plurality of interface functions for performing operations in a graphics processing unit (GPU), wherein the plurality of interface functions are configured to process or feedback parameters of the graph computing, and the parameter of the graph computing comprises a weight of the vertex;
during the execution of the graph computing, calling, by the execution engine, the plurality of interface functions through a graph computing interface; executing the interface functions in parallel through a plurality of parallel threads in the GPU, wherein the interface functions are configured to process a plurality of vertexes in image data to be processed in parallel, and the plurality of parallel threads are configured to feedback respective execution results of the interface functions to the execution engine; and
completing the graph computing by the execution engine according to the execution results;
wherein the plurality of interface functions comprise:
a prediction interface function on a gathering direction, configured to obtain parameters of in edges;
an apply interface function for changing data, configured to update preset parameters of a target vertex;
a prediction interface function on a scattering direction, configured to obtain parameters of out edges of the target vertex by calling;
a scatter interface function, configured to update a correspondent vertex of the out edges with the update data;
a gather interface function, configured to obtain preset parameters of a correspondent vertex of each in edge; and
a sum interface function, configured to sum the preset parameters of the correspondent vertexes of the in edges.

2. The method according to claim 1, wherein calling, by the execution engine, the plurality of interface functions through the graph computing interface, comprises:
obtaining, by the execution engine, the parameters of in the edges by calling the prediction interface function on the gathering direction;
converging, by the execution engine, preset parameters of a target vertex according to the parameters of the in edges to obtain update data of the target vertex; and
updating, by the execution engine, the preset parameters of the target vertex by calling the apply interface function for changing data.

3. The method according to claim 2, wherein the method further comprises:
obtaining, by the execution engine, the parameters of the out edges of the target vertex by calling the prediction interface function on the scattering direction; and
updating, by the execution engine, the correspondent vertex of the out edges with the update data by calling the scatter interface function.

4. The method according to claim 2, wherein converging, by the execution engine, the preset parameters of the target vertex according to the parameters of the in edges to obtain the update data of the target vertex comprises:

obtaining, by the execution engine, an adjacency index of the in edges of the target vertex by accessing a database; and
converging, by the execution engine, the preset parameters of the target vertex according to the adjacency index of the in edges to obtain the update data of the target vertex.

5. The method according to claim 4, wherein converging, by the execution engine, the preset parameters of the target vertex according to the adjacency index of the in edges to obtain the update data of the target vertex comprises:
obtaining, by the execution engine, all in edges according to the adjacency index of the in edges;
obtaining, by the execution engine, the preset parameters of the correspondent vertex of each in edge by calling the gather interface function; and
calling, by the execution engine, the sum interface function in the GPU to sum the preset parameters of the correspondent vertexes of the in edges to obtain the update data of the target vertex.

6. The method according to claim 1, wherein calling, by the execution engine, the plurality of interface functions through the graph computing interface, comprises:
partitioning, by the execution engine, graph data to be processed according to a size of memory space of the GPU to obtain a plurality of fractions of vertexes, wherein a size of each fraction of vertex matches with the size of the memory space of the GPU; and
calling, by the execution engine, the plurality of interface functions through the graph computing interface to sequentially perform the graph computing on the plurality of fraction of vertexes.

7. An electronic device, comprising:
at least one central processing unit (CPU) and a graphics processing unit (GPU); and
a memory connected in communication with the at least one CPU or the GPU;
wherein the memory stores instructions executable by the at least one CPU or the GPU, and when the instructions are executed by the at least one CPU, the at least one CPU or the GPU is configured to:
configure, by a configuring module, an execution engine in a central processing unit (CPU), wherein processor resources are required from the CPU to be used by the execution engine, and the execution engine is configured to manage execution of the graph computing;
configure, by execution engine module, a plurality of interface functions for performing operations in a graphics processing unit (GPU), wherein the plurality of interface functions are configured to process or feedback parameters of the graph computing, and the parameter of the graph computing comprises a weight of the vertex;
during the execution of the graph computing, control the execution engine to call the plurality of interface functions through a graph computing interface; wherein the interface functions perform operations in parallel through a plurality of parallel threads in the GPU, the interface functions are configured to process a plurality of vertexes in image data to be processed in parallel, and the plurality of parallel threads are configured to feedback respective execution results of the interface functions to the execution engine; and
control the execution engine to complete the graph computing according to the execution results;

wherein the plurality of interface functions comprise:
a prediction interface function on a gathering direction, configured to obtain parameters of in edges;
an apply interface function for changing data, configured to update preset parameters of a target vertex;
a prediction interface function on a scattering direction, configured to obtain parameters of out edges of the target vertex by calling;
a scatter interface function, configured to update a correspondent vertex of the out edges with the update data;
a gather interface function, configured to obtain preset parameters of a correspondent vertex of each in edge; and
a sum interface function, configured to sum the preset parameters of the correspondent vertexes of the in edges.

8. The electronic device according to claim 7, wherein the at least one CPU or the GPU is configured to control the execution engine to call the plurality of interface functions through the graph computing interface by:
controlling the execution engine to obtain the parameters of the in edges by calling the prediction interface function on the gathering direction;
controlling the execution engine to converge, preset parameters of a target vertex according to the parameters of the in edges to obtain update data of the target vertex; and
controlling the execution engine to update the preset parameters of the target vertex by calling the apply interface function for the changing data.

9. The electronic device according to claim 8, wherein the at least one CPU or the GPU is configured to:
control the execution engine to obtain the parameters of the out edges of the target vertex by calling the prediction interface function on the scattering direction; and
control the execution engine to update the correspondent vertex of the out edges with the update data by calling the scatter interface function.

10. The electronic device according to claim 8, wherein the at least one CPU or the GPU is configured to control the execution engine to converge the preset parameters of the target vertex according to the parameters of the in edges to obtain the update data of the target vertex by:
controlling the execution engine to obtain an adjacency index of the in edges of the target vertex by accessing a database; and
controlling the execution engine to converge the preset parameters of the target vertex according to the adjacency index of the in edges to obtain the update data of the target vertex.

11. The electronic device according to claim 10, wherein the at least one CPU or the GPU is configured to control the execution engine to converge the preset parameters of the target vertex according to the adjacency index of the in edges to obtain the update data of the target vertex by:
controlling the execution engine to obtain all in edges according to the adjacency index of the in edges;
controlling the execution engine to obtain the preset parameters of the correspondent vertex of each in edge by calling the gather interface function; and
controlling the execution engine to call the sum interface function in the GPU to sum the preset parameters of the correspondent vertexes of the in edges to obtain the update data of the target vertex.

12. The electronic device according to claim 7, wherein the at least one CPU or the GPU is configured to control the execution engine to call the plurality of interface functions through the graph computing interface by:
controlling the execution engine to partition graph data to be processed according to a size of memory space of the GPU to obtain a plurality of fractions of vertexes, wherein a size of each fraction of vertex matches with the size of the memory space of the GPU; and
controlling the execution engine to call the plurality of interface functions through the graph computing interface to sequentially perform the graph computing on the plurality of fraction of vertexes.

13. A non-transitory computer-readable storage medium, storing computer instructions, wherein the computer instructions are used to cause the computer execute a method for graph computing, the method comprising:
configuring, by a configuring module, an execution engine in a central processing unit (CPU), wherein processor resources are required from the CPU to be used by the execution engine, and the execution engine is configured to manage execution of the graph computing;
configuring, by an execution engine module, plurality of interface functions for performing operations in a graphics processing unit (GPU), wherein the plurality of interface functions are configured to process or feedback parameters of the graph computing, and the parameter of the graph computing comprises a weight of the vertex;
during the execution of the graph computing, calling, by the execution engine, the plurality of interface functions through a graph computing interface; wherein the interface functions perform operations in parallel through a plurality of parallel threads in the GPU, the interface functions are configured to process a plurality of vertexes in image data to be processed in parallel, and the plurality of parallel threads are configured to feedback respective execution results of the interface functions to the execution engine; and
completing the graph computing by the execution engine according to the execution results;
wherein the plurality of interface functions comprise:
a prediction interface function on a gathering direction, configured to obtain parameters of in edges;
an apply interface function for changing data, configured to update preset parameters of a target vertex;
a prediction interface function on a scattering direction, configured to obtain parameters of out edges of the target vertex by calling;
a scatter interface function, configured to update a correspondent vertex of the out edges with the update data;
a gather interface function, configured to obtain preset parameters of a correspondent vertex of each in edge; and
a sum interface function, configured to sum the preset parameters of the correspondent vertexes of the in edges.

14. The non-transitory computer-readable storage medium according to claim 13, wherein calling, by the execution engine, the plurality of interface functions through the graph computing interface, comprises:
obtaining, by the execution engine, the parameters of the in edges by calling the prediction interface function on the gathering direction;
converging, by the execution engine, the preset parameters of the target vertex according to the parameters of the in edges to obtain update data of the target vertex; and updating, by the execution engine, the preset parameters of the target vertex by calling the apply interface function for changing data.

15. The non-transitory computer-readable storage medium according to claim 14, wherein the method further comprises:
  obtaining, by the execution engine, the parameters of the out edges of the target vertex by calling the prediction interface function on the scattering direction; and
  updating, by the execution engine, the correspondent vertex of the out edges with the update data by calling the scatter interface function.

16. The non-transitory computer-readable storage medium according to claim 14, wherein converging, by the execution engine, the preset parameters of the target vertex according to the parameters of the in edges to obtain the update data of the target vertex comprises:
  obtaining, by the execution engine, an adjacency index of the in edges of the target vertex by accessing a database; and
  converging, by the execution engine, the preset parameters of the target vertex according to the adjacency index of the in edges to obtain the update data of the target vertex.

17. The non-transitory computer-readable storage medium according to claim 16, wherein converging, by the execution engine, the preset parameters of the target vertex according to the adjacency index of the in edges to obtain the update data of the target vertex comprises:
  obtaining, by the execution engine, all in edges according to the adjacency index of the in edges;
  obtaining, by the execution engine, the preset parameters of the correspondent vertex of each in edge by calling the gather interface function; and
  calling, by the execution engine, the sum interface function in the GPU to sum the preset parameters of the correspondent vertexes of the in edges to obtain the update data of the target vertex.

18. The non-transitory computer-readable storage medium according to claim 13, wherein calling, by the execution engine, the plurality of interface functions through the graph computing interface, comprises:
  partitioning, by the execution engine, graph data to be processed according to a size of memory space of the GPU to obtain a plurality of fractions of vertexes, wherein a size of each fraction of vertex matches with the size of the memory space of the GPU; and
  calling, by the execution engine, the plurality of interface functions through the graph computing interface to sequentially perform the graph computing on the plurality of fraction of vertexes.

\* \* \* \* \*